(12) United States Patent
Bertels et al.

(10) Patent No.: US 12,113,399 B2
(45) Date of Patent: Oct. 8, 2024

(54) DOOR DRIVE WITH A SMALL HIGH-PERFORMANCE MOTOR UNIT

(71) Applicant: dormakaba Deutschland GmbH, Ennepetal (DE)

(72) Inventors: Dennis Bertels, Ennepetal (DE); Martin Wagner, Ennepetal (DE); Dietmar Finis, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 127 days.

(21) Appl. No.: 17/782,862

(22) PCT Filed: Dec. 3, 2020

(86) PCT No.: PCT/EP2020/084535
§ 371 (c)(1),
(2) Date: Jun. 6, 2022

(87) PCT Pub. No.: WO2021/115930
PCT Pub. Date: Jun. 17, 2021

(65) Prior Publication Data
US 2023/0017823 A1    Jan. 19, 2023

(30) Foreign Application Priority Data
Dec. 9, 2019 (EP) ..................... 19214435

(51) Int. Cl.
*H02K 15/03* (2006.01)
*E05F 15/643* (2015.01)
*H02K 1/278* (2022.01)

(52) U.S. Cl.
CPC .......... *H02K 1/278* (2013.01); *E05F 15/643* (2015.01); *H02K 15/03* (2013.01)

(58) Field of Classification Search
CPC ....... H02K 1/278; H02K 15/03; E05F 15/632; E05F 15/643; E05Y 2900/132; E05Y 2201/438; E05Y 2201/46; E05Y 2600/526
See application file for complete search history.

(56) References Cited

U.S. PATENT DOCUMENTS 4,594,525 A * 6/1986 Stokes .................. H02K 1/278
                                                                310/43
5,397,951 A * 3/1995 Uchida .................. H02K 1/278
                                                                310/91

(Continued)

FOREIGN PATENT DOCUMENTS

DE    102008046062 A1    3/2010
DE    102008047310 A1    4/2010

(Continued)

OTHER PUBLICATIONS

International Search Report issued Feb. 4, 2021 re: Application No. PCT/EP2020/084535, pp. 1-2, citing: DE 102014115931 A1, US 20100244607 A1 and DE 102008047310 A1.

*Primary Examiner* — Thai T Dinh
(74) *Attorney, Agent, or Firm* — CANTOR COLBURN LLP

(57) ABSTRACT

A door drive for arrangement on or in connection with a door system, whereby at least one leaf element of the door system is movable. The door drive includes a motor unit with a housing, in which a stator is stationarily received, and wherein a rotor is arranged so as to be rotationally-movable in the housing and includes an output shaft, wherein the output shaft can be brought into operative connection in a driving manner with the leaf element. The rotor includes a support body, on which receiving fields are formed, on which permanent magnets are adhered.

12 Claims, 4 Drawing Sheets

(56) References Cited

U.S. PATENT DOCUMENTS

| | | | | |
|---|---|---|---|---|
| 7,545,067 | B2* | 6/2009 | Drexlmaier | H02K 1/278 |
| | | | | 310/156.19 |
| 9,048,711 | B2* | 6/2015 | Booth | H02K 1/2791 |
| 10,355,545 | B2* | 7/2019 | Shimamori | H02K 1/2706 |
| 11,245,298 | B2* | 2/2022 | Ding | H02K 5/22 |
| 2010/0244607 | A1* | 9/2010 | Fujimoto | H02K 1/2781 |
| | | | | 310/156.31 |
| 2011/0175480 | A1* | 7/2011 | Booth | H02K 1/278 |
| | | | | 310/156.47 |
| 2015/0162789 | A1* | 6/2015 | Tanaka | H02K 1/278 |
| | | | | 310/156.28 |

FOREIGN PATENT DOCUMENTS

| | | | | |
|---|---|---|---|---|
| DE | 102014115931 A1 * | 5/2016 | | H02K 1/2786 |
| DE | 102014115932 A1 | 5/2016 | | |

\* cited by examiner

DOOR DRIVE WITH A SMALL HIGH-PERFORMANCE MOTOR UNIT

TECHNICAL FIELD

The disclosure relates to a door drive for arrangement on or in connection with a door system, by means of which drive at least one leaf element of the door system is movable, including a motor unit with a housing, in which a stator is stationarily received and wherein a rotor is arranged so as to be rotationally-movable in the housing and includes an output shaft, wherein the output shaft can be brought into operative connection in a driving manner with the leaf element. Furthermore, the disclosure relates to a door system with such a door drive, including at least one leaf element, with which the door drive is in operative connection in a driving manner.

BACKGROUND

A door drive for arrangement on a door system is known from DE 10 2008 046 062 A1, and the drive serves to move leaf elements of the door system, which is formed as an automatic sliding door. For this purpose, the door drive includes a motor unit with a housing, and a gear unit, which is embodied as a worm gear and is attached to the housing of the motor unit. Thus, the motor unit is designed as a high-speed motor, and the gear unit reduces the higher rotational speed of the rotor of the motor unit to a lower rotational speed for driving a belt pulley, which is placed on an output shaft of the gear unit.

A toothed belt, which is connected to the leaf elements of the automatic sliding door, is guided via the belt pulley. Since the motor unit is designed to rotate at high speed, and the rotational speed needs to be reduced to the belt pulley, the gear unit is necessary in conjunction with the motor, whereby additional construction space is required and whereby the construction of the door drive is more complex. The spatial dimensioning of the door drive needs to be adapted to the requirements of the gear unit, and since the motor has a cylindrical basic shape, it takes up the construction space, which, in terms of the installation environment, does not allow for optimum use of the space. The same applies to a worm gear, which in particular in connection with the motor runs transversely and therefore requires a lot of construction space.

In particular, when the output shaft is supposed to run horizontally to directly receive a belt pulley in the installed state of the door system, the motor design especially in the extension direction of the output shaft must be short, because otherwise problems with the construction space arise when installing the motor unit. The reason is that the slider driven with a toothed belt via the belt pulley, in the support profile, which serves for receiving a leaf element for example of an automatic sliding door, must be able to run past the belt pulley even within the support profile. Therefore, in the extension direction of the rotor axis, the motor unit should be as short as possible.

DE 10 2014 115 932 A1 discloses another door drive, and the door drive includes a one-piece cuboidal body as the basic body, into which recesses are introduced for the purpose of receiving a motor unit and a gear stage. In order to also receive a controller, a power unit and the like, further recesses and openings are provided in the block. Thus, the cuboidal body forms a housing as a support for the individual components of the door drive and is embodied as one piece and, in a sense, monolithically over the entire dimension of the drive. The rotor is supported by means of an upright axle enclosed in the cuboidal body of the door drive, whereby, due to the axle enclosed on one side, a disadvantageous load condition results, in particular if, in case of large heavy all-glass leaf elements, high forces are introduced via the gear stage into the rotor, which have to be absorbed via the opposingly enclosed upright axle.

Basically, when constructing door drives for arrangement on or in connection with a door system, the aim is to embody the door drive as compact as possible and with small dimensions, for example by a gear unit or a gear stage already being avoided within the door drive. Usually, door drives are arranged above the linearly movable leaf elements of an automatic sliding door system and have a support profile, which forms a basic body of the door system and the door drive is mounted in the support profile in an integrated manner and likewise the leaf elements are linearly guided therein. Generally, a toothed belt serves as the connecting means between the door drive and the leaf elements, wherein other traction means, such as chain connections and the like are also possible. The door drive with at least the motor, a power unit and a controller thereby forms a separate structural unit, which, when arranged on the support profile, is integrated into the door system.

In order to embody the support profile with a corresponding screen, a housing or other adjacent parts so as to be as small as possible, it is advantageous to also embody in particular the door drive itself as compact as possible and with small dimensions. However, since leaf elements made of glass can have large masses, the door drive must have a high power density, in order to be able to correspondingly strongly accelerate and also to decelerate such leaf elements in spite of the small dimensions, so that the door system, even with large leaf elements, still achieves the required dynamics.

For a high power density and in particular a low-noise operation, motor units in conjunction with a toothed belt are suitable as direct drives, in which the belt pulley is directly installed on the output shaft of the motor unit, over which belt pulley the toothed belt is placed, which in turn is directly connected to the leaf elements. As a result, the door drive can be operated with minimum noise, because high rotational motor speeds are not reached, and with a corresponding design of the motor unit, power densities can be provided, which are sufficient to sufficiently strongly accelerate and also to decelerate leaf elements of for example 200 kg to 250 kg for operating an automatic sliding door.

In the case of a motor unit with a direct drive, rather low rotational speeds of the rotor associated with high torques are often implemented, whereby a particularly robust support of the rotor in the housing of the motor unit is necessary.

According to a regular construction shape, the stator includes a number of coils, which, with an internal rotor, are attached to teeth of the stator pointing radially inwards. Within the teeth pointing radially inwards, the rotor is received so as to be rotationally-movable and comprises a number of permanent magnets. If the coils are electrically actuated and radially circumferentially energized, the rotor with the permanent magnets is set into rotation. In this case, linking the permanent magnets to a support body of the rotor is often an issue. Generally, the permanent magnets are fixed with clamp elements on the support body or are cast with a casting compound together with the support body.

SUMMARY

The disclosure provides a door drive with a motor unit, which has a high integration density and a high power density, and wherein the motor in conjunction with the at least one leaf element is to be embodied in particular as a direct drive. Despite the high integration density of the door drive, a compact embodiment of the motor unit should be achieved, which, in particular within the housing, has a high packing density.

This is achieved by providing a door drive according to claim 1 and based on a door system according to claim 15 with the respectively characterizing features. Advantageous further developments of the disclosure are indicated in the dependent claims and in the description.

The disclosure includes the technical teaching that the rotor includes a support body, on which receiving fields are formed, on which permanent magnets are adhered.

The core idea of the disclosure is a simple configuration of the rotor with the output shaft, including a support body with permanent magnets arranged thereon. In order to provide for a simple arrangement of the permanent magnets, in particular without the help of further elements, the disclosure proposes to create receiving fields on the outer circumference of the support body, on which the permanent magnets are adhered. By providing receiving fields, the positions of the permanent magnets to each other in arrangement on the support body are defined and advantageously the receiving fields can be embodied such that the adhesive connection can be sufficient for the retained arrangement of the permanent magnets on the support body.

In this case, the receiving fields do not have to form flat fields, and they can advantageously have at least one rectangular shape, to which the rectangular shape of the permanent magnets is adapted, such that the function of the precise positioning of the permanent magnets on the support body is hereby fulfilled. The rectangular shape has a longer and a shorter edge, wherein the longer edge runs parallel to the output shaft and thereby to the axis of rotation of the rotor.

The support body with a number of receiving fields on its outer circumference and the permanent magnets themselves can be dimensioned such that a very small gap is created between the outer side of the permanent magnets and the inner side of the teeth of the stator. As a result, the torque of the motor unit is increased in the case of otherwise unchanged outer dimensions, and in the case of a casting compound, the surface of the permanent magnets can be very close in dimensioning to the inner surface of the teeth of the stator, on which the coils with the winding wire are attached.

Advantageously, the rotor includes a circumferential area, which forms a polygonal shape with the receiving fields. Advantageously, separating webs, which form a part of the circumferential area and extend parallel to an axis of rotation of the output shaft and therefore of the rotor, are formed between the receiving fields. The separating webs separate two receiving fields adjacent to each other and simultaneously serve for aligning and positioning the adhered permanent magnets. In particular, the separating webs serve for ensuring a defined distance between two adjacent permanent magnets.

The receiving fields particularly advantageously include a longitudinal extension running parallel to the axis of rotation between the separating webs and it is provided that narrow overlay strips are formed over the longitudinal edge of the receiving fields adjoining the separating webs. The permanent magnets can be placed in a defined manner on said overlay strips, wherein the side of the permanent magnets pointing towards the support body is formed flat, for example. The front surface of the permanent magnets pointing radially outwards can have a curvature, which corresponds to the radius of the rotor, while the rear surface of the permanent magnets pointing inwards is flat, for example, however, this does not have to be the case. This further improves the gap between the permanent magnets and the end surfaces of the teeth of the stator pointing inwards.

The receiving fields comprise a depressed area between the overlay strips such that when arranging the permanent magnets on the receiving fields, a width-defined adhesive gap is formed for receiving adhesives. Therefore, the receiving fields are particularly advantageously not flat, but rather a slight depression in the receiving fields creates the depressed areas, which serve for receiving adhesives, in particular when the side of the permanent magnets pointing towards the receiving fields is flat. The depth of the depressed area and therefore the configuration of the adhesive gap is adapted to the adhesive used. In particular, an acrylate adhesive and/or an anaerobic adhesive can be used, for example LOCTITE-3342™.

Furthermore, it is provided that the permanent magnets, on the side facing away from the output shaft, can protrude beyond the support body and therefore, if required, also beyond the stator. This is advantageous in that Hall sensors, which can enter into interaction with the permanent magnets, can be attached in or on the housing, in particular in order to provide an actuation for the electronic commutation of the slow-running electric motor by means of the controller.

Furthermore, the support body has a T-shape with regard to its circumferential cross-section, which can also be described as having an H-shape in the half-section, whereby in any case inner recesses are formed, which are radially circumferential and into which bearing elements can be introduced for supporting the output shaft in the housing of the motor unit. If the motor unit is mounted, the free areas within the support body are filled with the bearing elements, which are introduced into bearing receiving sections, which in turn can be moulded onto the housing halves. Due to the H-shape in the cross-section of the support body, the function for receiving the permanent magnets is not negatively affected, however, the bearing elements for supporting the rotor can be received in the motor unit, at least predominately, at the height of the radial inner sides of the rotation cylinder of the permanent magnets.

According to a further advantageous embodiment, the output shaft is formed with a circumferential rotor section, on which the support body fitted with the permanent magnets is attached, wherein the output shaft in particular has a first bearing section and a second bearing section, in each of which one bearing element is received, wherein the rotor receiving section is formed between the bearing sections.

Further advantageously, the support body is formed from a metallic sintered material.

Alternatively, it can be provided that the support body is formed from a metallic casting material, in particular fine casting material.

Furthermore, there is advantageously the possibility that a film-like retaining body is attached to the support body fitted with the permanent magnets. The film-like retaining body can be formed by an insulating tube made of polyester film, which is shrink-fitted onto the support body fitted with the permanent magnet. In this case, the polyester film is so thin that it also fits into the gap between the outer side of the permanent magnets and the inner side of the teeth of the stator. For example, the polyester film has a thickness of 0.1 mm. The use of such a polyester film as the insulating tube ensures that, even in the case of unintended loosening of the adhesive connection, a permanent magnet does not detach from the support body, and would thus block the motor unit.

Alternatively, the film-like retaining body is formed from a winding body of fibre glass film or from a fibre glass fabric.

The output shaft can extend from an end face of the housing such that a toothed belt is attached onto said section of the output shaft. A toothed belt, which can be directly connected to the leaf elements of the door system, is placed over the belt pulley. Therefore, the door drive with the motor unit is embodied as a direct drive, and the arrangement of a gear is redundant.

Furthermore, the disclosure relates to a door system with a door drive having the above-described features. The door system can include a connecting element to connect to a leaf element. Additionally or alternatively, the door system can include at least one leaf element with which the door drive is operatively connected in a driving manner.

For example, the door system can be formed as a sliding door system. The sliding door system can comprise a belt, in particular a toothed belt. The connecting element can be at least indirectly connected to the belt. The connecting element can be formed as a slider, in particular as a roller carriage. The connecting element can run in a rail, in particular in a rail of the support profile. The belt can be tensioned between belt pulleys of the door system. One of the belt pulleys can be formed as the belt pulley of the door drive according to the disclosure.

BRIEF DESCRIPTION OF THE DRAWINGS

Further measures improving the disclosure are represented below in detail together with the description of one preferred exemplary embodiment of the disclosure based on the figures, in which is shown.

DETAILED DESCRIPTION OF THE DRAWINGS

Figure 1:
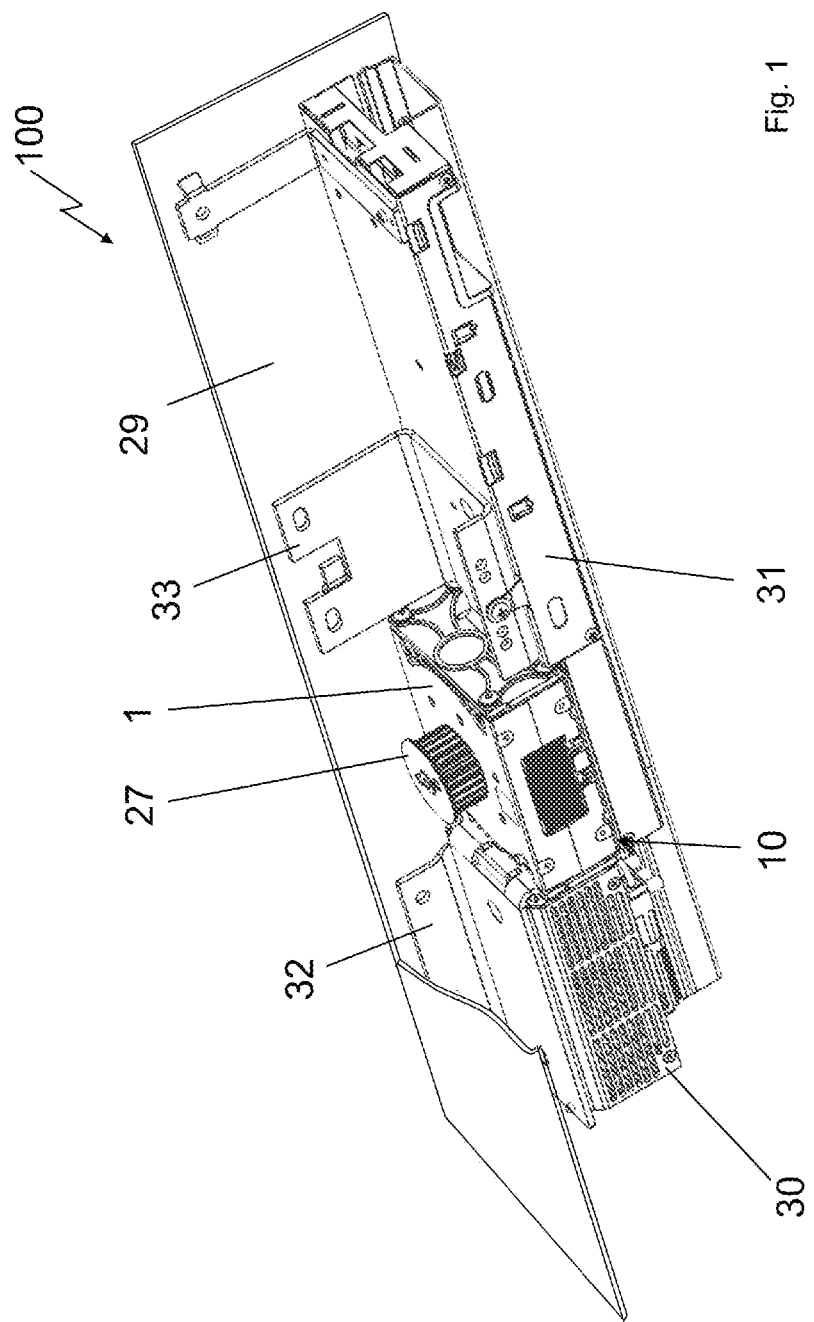
FIG. 1 an overall view of the door drive with a motor unit according to the disclosure, FIG. 2 a perspective view of the motor unit with a removed upper housing half, FIG. 3 a half-section of the motor unit without an upper housing half, FIG. 4 a perspective view of the rotor of the motor unit, FIG. 5 a detailed view of a section of the rotor, and FIG. 6 a perspective view of a permanent magnet.

FIG. 1 shows an overall view of the door drive 100, as the same, in connection with a door system, can be installed in a building, with the installation on ships and in airplanes also being included, and a door drive 100 of this type serves for example as a drive for an automatic sliding door system. The basic structure of the door drive 100 forms a support profile 29, which, for a simpler view, is illustrated shortened, moreover the essential upper part of the L-shaped support profile 29 is shown sectioned in order to further reveal the further essential components of the door drive 100 in this case.

As a central component, the door drive 100 includes a motor unit 1, which has the basic shape of a cuboid, which forms the housing 10 of the motor unit 1. In order to enable an output and therefore a connection to a leaf element, not represented in more detail, of a door system, a belt pulley 27 is arranged on the motor unit 1, over which a toothed belt can be placed, which ultimately establishes the connection to the leaf element/s, for example the glass sliding elements.

Adjacent to the motor unit 1, the door drive 100 includes a power unit 30 and a controller 31, and the power unit 30 and the controller 31 are arranged at opposite sides of the motor unit 1. The motor unit 1 is fastened to the support profile 29 with a first flange element 32, wherein the first flange element 32 simultaneously receives the power unit 30 in a retaining manner. Furthermore, the motor unit 1 is connected to the support profile 29 with a second flange element 33, wherein the second flange element 33 simultaneously receives the controller 31. Alternatively, the embodiment of a single flange is also possible in order to receive at least the motor unit 1, the power unit 30 and the controller 31. Furthermore, there is the possibility for the motor unit 1, the power unit 30 and/or the controller 31 to include respectively assigned separate flange elements for arrangement in or on the support profile 29.

Figure 2:
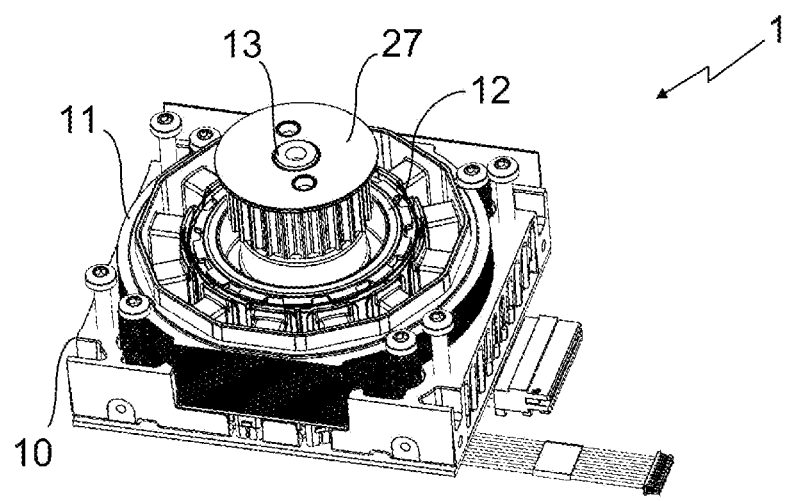

FIG. 2 shows a perspective view of the motor unit 1 with the housing 10, wherein only a lower housing half is represented, and the upper housing half has been removed for the representation of further components of the motor unit 1. A stator 11 is mounted on the inside of the housing 10, in particular relating to the lower housing half according to the representation, and a rotor 12 in an output shaft 13 is rotatably received within the stator 11. A belt pulley 27 is attached onto the output shaft 13 above the upper part of the housing not represented such that the motor unit 1 is embodied as a direct drive, and only a toothed belt extends between the motor unit 1 and the leaf elements of the door system, for example, an automatic sliding door.

Figure 3:
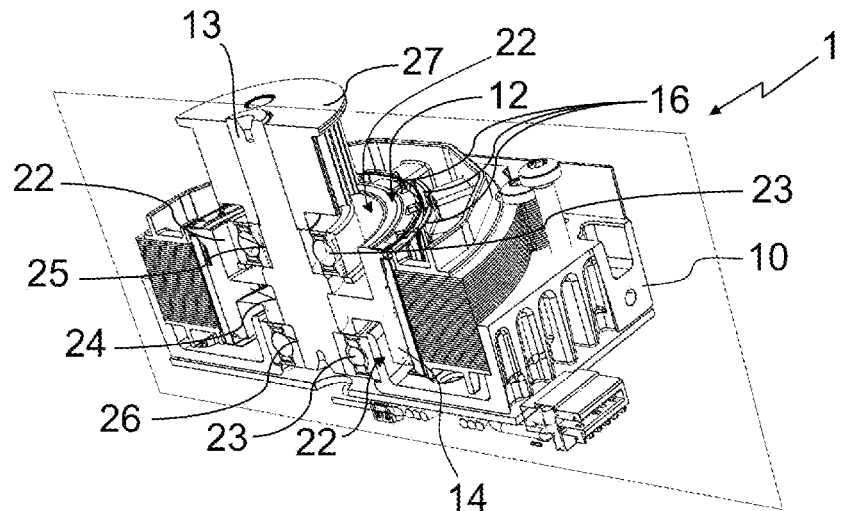

FIG. 3 shows, in a cross-sectional view, the motor unit 1 with the rotor 12, which as essential components includes the output shaft 13 and a support body 14, and on the outside of the support body 14 are attached permanent magnets 16 at the regular distances. The belt pulley 27 is attached on the output shaft 13, on a part protruding from the housing 10.

The output shaft 13 is formed with a rotor receiving section 24, on which the support body 14 fitted with the permanent magnets 16 is attached. Furthermore, the output shaft 13 includes a first bearing section 25 and a second bearing section 26, on which respectively one bearing element 23 is received. With regard to the longitudinal axis of the output shaft 13, in this case, the rotor receiving section 24 is located between the bearing sections 25 and 26.

With regard to its circumferential cross-section, the support body 14 has a T-shape, wherein the shape of the support body 14 can be described as an H-shape with regard to its entire cross-section. As a result, inner recesses 22 are formed, into which the bearing elements 23 are introduced.

Figure 4:
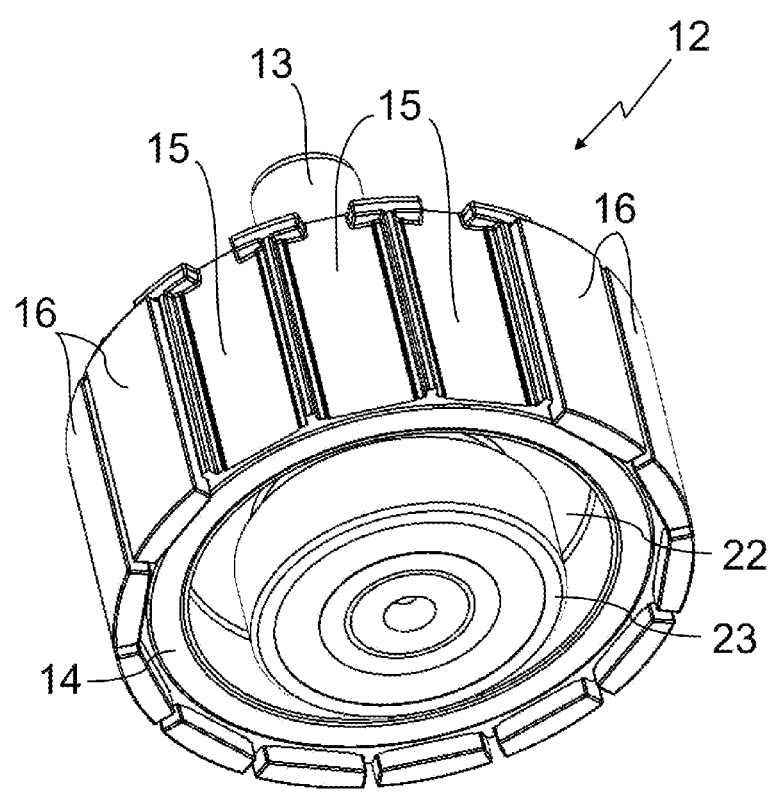

FIG. 4 shows a perspective view of the rotor 12 with the output shaft 13 and with the support body 14, wherein a lower recess 22 is visible. Within the single visible recess 22 within the support body 14 a bearing element 23 is shown inserted by way of example, which serves to rotatably receive the output shaft 13. On the outer circumference, the support body 14 has receiving fields 15, on which the permanent magnets 16 are attached, wherein by way of example a permanent magnet 16 is not shown in the case of three receiving fields 15.

Figure 5:
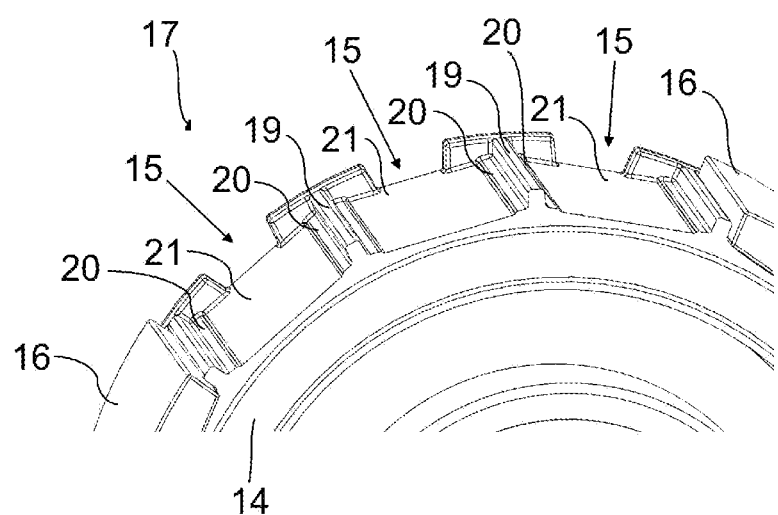

FIG. 5 shows an enlarged view of the part of the support body 14 in the circumferential area of the removed permanent magnets 16 according to FIG. 4. The thus freely visible receiving fields 15 are separated from each other by separating webs 19, which form a part of the circumferential area 17 of the rotor 12, and the separating webs 19 extend parallel to the axis of rotation of the rotor, namely in its vertical direction. Laterally on the separating webs 19 are formed overlay strips 20, on which the permanent magnets 16 rest and therefore obtain a defined placement.

Depressed areas 21 extend between the overlay strips 20, and if the permanent magnets 16 are arranged on the receiving fields 15, they rest laterally on the overlay strips 20 and are retained by an adhesive, which is located in the gap thus formed between the permanent magnets 16 and the depressed area 21 of the receiving fields 15. A defined adhesive gap is achieved over the depressed area 21 with a slightly concave arching such that an acrylate adhesive, in particular an anaerobic adhesive, can achieve a correspondingly high adhesive performance. This ensures that the shear permanent magnets 16 do not become loose when operating the motor unit 1, wherein, due to the direct drive connection to the toothed belt and therefore to a leaf element of a door system, the motor unit 1 is formed as a slow-running motor, such that the rotor does not reach high rotational speeds, and therefore the flow forces of the permanent magnets 16 are also not too high when operating the motor unit 1.

Figure 6:
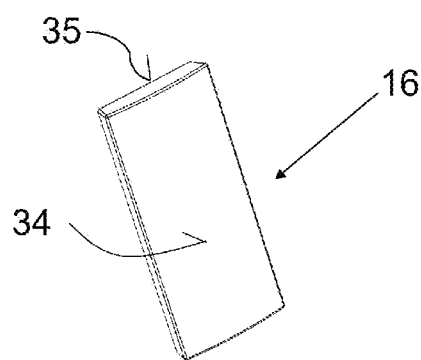

Finally, FIG. 6 shows an individual view of a permanent magnet 16, and a front surface 24 forms a curved outer side, which, in the adhered state, points in the direction of the stator, and a rear surface 25 preferably forms a flat surface, which points in the direction of the receiving field 15 and, with the depressed area 21, forms a cavity for the adhesive.

The design of disclosure is not limited to the above indicated preferred exemplary embodiment. In fact, a number of variants is conceivable, which make use of the represented solution, even with essentially different types of designs. All features and/or advantages including the constructive details or spatial arrangements, emerging from the claims, the description or the drawings, may be essential to the disclosure, both by themselves and in the most varied combinations.

The invention claimed is:

1. A door drive for arrangement on or in connection with a door system, whereby at least one leaf element of the door system is movable, including a motor unit with a housing, in which a stator is stationarily received, and wherein a rotor is arranged so as to be rotationally-movable in the housing and includes an output shaft,
   wherein the output shaft is configured to be brought into operative connection in a driving manner with the leaf element,
   wherein the rotor includes a support body, on which receiving fields are formed, on which permanent magnets are adhered,
   wherein the rotor has an axis of rotation, wherein separating webs are formed between the receiving fields, which form a part of the circumferential area and extend parallel to the axis of rotation,
   wherein the receiving fields have a longitudinal extension running parallel to the axis of rotation between the separating webs and over their longitudinal edge are formed with overlay strips laterally adjoining the separating webs.

2. The door drive according to claim 1, wherein the receiving fields have a depressed area between the overlay strips such that, when the permanent magnets are arranged on the receiving fields, a defined adhesive gap is formed for receiving adhesive.

3. The door drive according to claim 1, wherein, on the side facing away from the output shaft, the permanent magnets protrude beyond the support body.

4. The door drive according to claim 1, wherein, with regard to its circumferential cross-section, the support body has a T-shape and/or, with regard to its half-section, has an H-shape, whereby inner recesses are formed, into which bearing elements are introduced.

5. The door drive according to claim 1, wherein the output shaft is formed with a rotor receiving section, on which the support body fitted with the permanent magnets is attached and/or wherein the output shaft has a first bearing section and a second bearing section, on each of which one bearing element is received, wherein the rotor receiving section is formed between the bearing sections.

6. The door drive according to claim 1, wherein the support body is formed from a metallic sintered material or a casting material.

7. The door drive according to claim 1, wherein a film retaining body is attached on the support body fitted with the permanent magnets.

8. The door drive according to claim 7, wherein the film retaining body includes an insulating tube made of polyester film and configured to be shrink-fitted onto the support body fitted with the permanent magnets.

9. The door drive according to claim 7, wherein the film retaining body is formed from a winding body of a fibre glass film or a fibre glass fabric.

10. The door drive according to claim 1, wherein the output shaft extends in sections from an end face of the housing such that a belt pulley is attached on said section of the output shaft.

11. The door drive according to claim 1, wherein the adhesive for adhering the permanent magnets onto the support body of the rotor comprises acrylate adhesive and/or an anaerobic adhesive.

12. A door system with a door drive according to claim 1, including at least one connecting element for connecting to a leaf element and/or at least one leaf element, with which the door drive is operatively connected in a driving manner.

* * * * *